(12) United States Patent
Kleman (10) Patent No.: US 9,658,096 B2
(45) Date of Patent: May 23, 2017

(54) RADAR LEVEL GAUGE INCLINATION SYSTEM

(71) Applicant: Rosemount Tank Radar AB, Gothenburg (SE)

(72) Inventor: Mikael Kleman, Vreta Kloster (SE)

(73) Assignee: Rosemount Tank Radar AB, Gothenburg (SE)

( * ) Notice: Subject to any disclaimer, the term of this patent is extended or adjusted under 35 U.S.C. 154(b) by 220 days.

(21) Appl. No.: 14/319,340

(22) Filed: Jun. 30, 2014

(65) Prior Publication Data

US 2015/0377681 A1    Dec. 31, 2015

(51) Int. Cl.
| | |
|---|---|
| G01F 23/284 | (2006.01) |
| G01S 7/40 | (2006.01) |
| G01S 13/88 | (2006.01) |
| G01F 25/00 | (2006.01) |
| G01S 7/02 | (2006.01) |

(52) U.S. Cl.
CPC ........ *G01F 23/284* (2013.01); *G01F 25/0061* (2013.01); *G01S 7/4026* (2013.01); *G01S 13/88* (2013.01); *G01S 2007/027* (2013.01)

(58) Field of Classification Search
CPC ..... G01F 23/284; G01F 25/0061; G01S 13/88
See application file for complete search history.

(56) References Cited

U.S. PATENT DOCUMENTS

| 3,974,699 A | 8/1976 | Morris et al. |
| 5,072,615 A | 12/1991 | Nawrocki |

(Continued)

FOREIGN PATENT DOCUMENTS

| DE | 10 2004 041 857 | 2/2006 |
| GB | 1 294 417 | 10/1972 |

(Continued)

OTHER PUBLICATIONS

European Search Report from European Application No. 15174254.1, dated Nov. 27, 2015.

*Primary Examiner* — Lisa Caputo
*Assistant Examiner* — Punam Roy
(74) *Attorney, Agent, or Firm* — Westman, Champlin & Koehler, P.A.

(57) ABSTRACT

A radar level gauge arrangement for determining the fill level of a filling material in a tank is disclosed, which arrangement is mounted on a hatch of a tank and/or on a support which is adapted to be mounted on a hatch of a tank. The arrangement comprises a transmitter for transmitting measuring signals at least along a first axis for determining the fill level of the tank; a receiver for receiving echo signals corresponding to the distance to the surface; a first processing circuitry for receiving the echo signals and to determine a fill level of the tank based on the echo signal; an inclinometer attached to the support and adapted to generate an inclination output corresponding to the inclination relative the surface normal; a second processing circuitry for generating, based on the inclination output, an angular output when there is an angular difference between the first axis and the surface normal. The arrangement also comprises a presenter for communicating information about the angular difference externally of said system, or a communication path for communicating the angular output to said first processing circuitry.

20 Claims, 5 Drawing Sheets

(56) References Cited

U.S. PATENT DOCUMENTS

| | | | |
|---|---|---|---|
| 5,207,099 A | 5/1993 | Baker | |
| 5,386,736 A | 2/1995 | Spillman, Jr. | |
| 7,319,401 B2 | 1/2008 | Akerstrom et al. | |
| 7,835,880 B2 | 11/2010 | Lou | |
| 8,161,813 B2 | 4/2012 | Faist | |
| 8,726,728 B2* | 5/2014 | Sunesson | G01F 23/284 73/290 R |
| 2006/0044145 A1 | 3/2006 | Akerstrom et al. | |
| 2006/0201245 A1* | 9/2006 | Huber | G01F 23/003 73/290 R |
| 2010/0212397 A1* | 8/2010 | Kaya | G01F 17/00 73/1.73 |
| 2013/0120155 A1* | 5/2013 | Hagg | G01F 23/00 340/870.01 |
| 2013/0269414 A1 | 10/2013 | Ferraro et al. | |
| 2013/0269430 A1* | 10/2013 | Mauduit | G01F 23/284 73/290 V |

FOREIGN PATENT DOCUMENTS

| | | |
|---|---|---|
| JP | 2009-139212 | 6/2009 |
| KR | 10-2005-0070356 | 7/2005 |

* cited by examiner

RADAR LEVEL GAUGE INCLINATION SYSTEM

FIELD OF THE INVENTION

The present invention relates to a radar level gauge arrangement, and especially to a radar level gauge arrangement for measuring the fill level of a tank, comprising a transmitter for emitting measuring signals towards the surface of the filling material in the tank; a receiver device for receiving echo signals from the tank; and processing circuitry for determining the fill level of the tank based on said echo signal.

BACKGROUND AND SUMMARY OF THE INVENTION

Measuring the level of a liquid, fluids, granular compounds or other materials stored in a tank is a basic industrial need. Several technologies have historically been employed and the last decade radar has emerged as the dominating method for high quality measurements. These devices utilize antennas to transmit electromagnetic waves toward the material being monitored and to receive electromagnetic echoes which are reflected at the surface of the material being monitored. Today, numerous units for radar level gauging are installed worldwide, and among liquid level gauges the radar method has a growing percentage. The radar level gauges (RLGs) are typically mounted in tanks which can have a height from a few meter to 20-30 m or even more and with volumes from a few $m^3$ and up to 100 000 $m^3$ or more, typically located outdoors. High accuracy and reliability has been important virtues for RLGs.

One example of a field in which RLG systems or RLG arrangements are commonly used is for tanks in moving units, such as tanks on marine platforms or on tanker ships, for storage of liquid gas, oil, chemicals etc. These tanks are normally designed as large rectangular blocks, for which the area of the base can be very big, as great as the size of a football pitch with a height of up to 40 m. Since the area of the base of a tank of this type is large, it is of utmost importance that the liquid level can be read with a high degree of accuracy. The large area implies that small changes in the liquid level correspond to relatively large changes in the volume of liquid.

As stated above an RLG system or RLG arrangement utilize antenna(s) to transmit electromagnetic waves toward the material being monitored and to receive electromagnetic echoes which are reflected at the surface of the material being monitored. Such systems or arrangements could either use continuous signals, so-called FMCW (frequency modulated continuous wave) or pulsed transmitted signals.

Many of the installations, especially for the tank gauging market, are done on existing stilling wells (i.e. vertical pipes). In such applications an antenna suited for measurements in pipes may be used. The installation of this antenna may e.g. be performed by replacing an existing hatch on top of the pipe, which hatch is normally used for tape measurement and sampling of the tank content. In order to still be able to perform these tasks, the RLG can be fitted to a hatch which can be opened. If there is no existing hatch, one can be added.

As the RGL is attached to a hatch, it is always slightly moveable with respect to the tank. Further, the slightest dislocation of the radar beam is likely to result in misreadings from the radar. Hence, there is a need to have a better control of the position of the hatch.

According to a first aspect of the invention, there is provided a radar level gauge system for mounting on a hatch of a tank comprising:
a housing adapted to be attached to a hatch of a tank,
a support arranged inside the housing;
a transmitter arranged inside the housing, which transmitter is attached to the support and adapted to transmit measuring signals at least along a first axis for measuring the distance to a surface in a tank,
a receiver arranged inside the housing and adapted to receive echo signals corresponding to the distance to the surface in the tank when the first axis is parallel to a normal to the surface,
a first processing circuitry arranged inside the housing, adapted to receive the echo signals and to determine a fill level of the tank based on the echo signal,
an inclination sensor arranged inside the housing, which inclination sensor is attached to the support and adapted to generate an inclination output corresponding to the inclination of the sensor relative the normal to the surface,
a second processing circuitry arranged inside the housing and adapted to receive the inclination output and to generate, based on the inclination output, an angular output when there is an angular difference between the first axis and the normal to the surface,
further comprising at least one of:
a presenter adapted to receive the angular output from said second processing circuitry and to generate a communication output communicating information, about the angular difference, externally of said system,
a communication path arranged inside said housing, electrically connecting said first processing circuitry and second processing circuitry, and being adapted to receive the angular output from said second processing circuitry and to communicate the angular output to said first processing circuitry.

According to a second aspect of the invention, there is provided a radar level gauge arrangement comprising:
a housing attached to a hatch of a tank,
a transmitter arranged inside the housing, attached to a support and adapted to transmit measuring signals at least along a first axis for measuring the distance to a surface in a tank,
a receiver arranged inside the housing and adapted to receive echo signals corresponding to the distance to the surface in the tank when the first axis is parallel to a normal to the surface,
a first processing circuitry arranged inside the housing, adapted to receive the echo signals and to determine a fill level of the tank based on the echo signal,
an inclination sensor arranged inside the housing, attached to the support and adapted to generate an inclination output corresponding to the inclination of the sensor relative the normal to the surface,
a second processing circuitry arranged inside the housing and adapted to receive the inclination output and to generate, based on the inclination output, an angular output when there is an angular difference between the first axis and the normal to the surface,
further comprising at least one of:
a presenter adapted to receive the angular output from said second processing circuit and to generate a communication output communicating information about the angular difference externally of said system, and
a communication path arranged inside said housing, electrically connecting said first processing circuitry and second processing circuitry, and being adapted to receive the angular output from said second processing circuit and to communicate the angular output to said first processing circuitry.

According to a second aspect of the invention, there is provided a method for a radar level gauge system, which system is attached to the hatch of the tank, comprising:

transmitting measuring signals at least along a first axis for measuring the distance to a surface in a tank, receiving echo signals corresponding to the distance to the surface in the tank when the first axis is parallel to a normal to the surface, determining a fill level of the tank based on the received echo signal, generating an inclination output corresponding to the orientation of the first axis, generating, based on the inclination output, an angular output when there is an angular difference between the first axis and the normal to the surface, further comprising at least one of:

communicating information about the angular difference externally of said system, and initiating an action based on the angular output, which action affects the step of determining a fill level of the tank.

As used herein the term transmitter denotes a device that is capable of transmitting electromagnetic radiation. A transmitter may also be referred to as antenna herein, so what is stated about the antennas is also true for the transmitter, and vice versa.

As used herein the term transceiver denotes a device that is capable of transmitting and receiving radiation. In other words, a transceiver comprises a transmitter.

The radar level gauge system or radar level gauge arrangement is arranged to detect a distance to a surface of a product in a tank, and this is preferably done by emitting radiation along a first axis which is parallel to, or coincides with, a normal to said surface, which also may be referred to as a surface normal of the product or the surface normal, and the surface normal usually coincides with a vertical axis. The second processing circuitry generates an angular output when there is an angular difference between the first axis and the surface normal.

The angular output may be a value directly corresponding to the angular difference between the first axis and the surface normal, i.e. when the angular difference increases by one degree, so does the angular output. The angular output may also be given in another format, such that when the angular difference increases by one degree, the angular output increases with more or less than one degree. Further, said second processing circuitry may e.g. also be arranged such, that the inclination output is compared to one or more threshold value(s), and the angular output indicates the result of the comparison; e.g. that the angular difference exceeds or is lower than a predetermined value and/or that that the angular difference is within a predetermined interval. Hence, the angular output may be the same, although the angular difference increases by one degree; if this increase does not change the result of the comparison, e.g. that the angular difference exceeds a predetermined value. [The given lists of examples are non-exhaustive].

The angular difference generated by said second processing circuitry may be expressed by a vector comprising one, two or three elements. When the vector comprises three elements, the angular difference, from a vector, along each of three Cartesian axes may given; a vector comprising three elements can also be used for conveying information arranged in another format. When the vector comprises two elements, the angular difference, from a plane, along two Cartesian axes may given; a vector comprising two elements can also be used for conveying information arranged in another format. When the vector comprises one element, the angular difference from a vector in a predetermined plane may given; a vector comprising one element can also be used for conveying information arranged in another format. When the angular output indicates the result of a comparison; e.g. that the angular difference exceeds or is lower than a predetermined value and/or that that the angular difference is within a predetermined interval, this result may be expressed by a vector comprising one, two or three elements; the information can also be conveyed in another format.

Providing an inclination sensor, also referred to as inclinometer herein, to the radar level gauge system or radar level gauge arrangement provides e.g. the advantage that any dislocation of the hatch, which involves an inclination, may be monitored.

According to one exemplifying embodiment, the angular output may be communicated to said first processing circuitry, via a communication path arranged inside said housing, which communication path electrically connects the first processing circuitry and the second processing circuitry. Thereafter, the angular output may be used internally by the first circuit to e.g. correct the measured distance to the product surface, discontinue the transmittance of measuring signals, reset the distance measurements and/or automatically correct the orientation of the transmitter [the list is non-exhaustive].

Alternatively or additionally, the angular output may be communicated to a presenter adapted to receive the angular output from said second processing circuitry and to generate a communication output communicating information, about the angular difference, externally of said system. The communication output can e.g. be an alarm which is issued based on the value of the angular output. Additionally or alternatively, the communication output is adapted to aid the operator to align the measuring signals along the vertical axis. [the list is non-exhaustive]

Additionally or alternatively, the radar level gauge arrangement comprises means for receiving and/or storing at least one predetermined threshold value, and, before the angular output is communicated to the presenter, said second circuitry is adapted to receive the angular output, to compare said angular output to at least one predetermined threshold value, and to communicate, an angular output corresponding to the result of the comparison, to the presenter.

The threshold value may be a predetermined angular difference from the surface normal of e.g. 1, 5, 10, 15, 20, 25, 30, 35, 40, 45 or 50 degrees; or an interval comprising one, two, three or more of the listed angular differences. I.e. the first axis deviates from the surface normal by a predetermined angle, or is within a predetermined interval.

The threshold value may also be a predetermined angular difference between two different inclination outputs, or the angular velocity of the rotation of the first axis, i.e. a detection of that the first axis is moving. The predetermined angular difference may be e.g. 0.5, 1, 2, 3, 5, 10, 15, 20, 25, 30, 35, 40, 45 or 50 degrees; or an interval comprising one, two, three or more of the listed angular differences.

In more detail, misreadings may occur when the first axis deviates only slightly from the surface normal, i.e. when the angular difference is e.g. 3 or 5 or 7 degrees. Hence, it may be advantageous to detect and act on small misalignments, i.e. to generate a communication output when the angular difference exceeds e.g. 3, 5 or 7 degrees. Further, the more the hatch is opened, the more radiation will leak into the surroundings outside the tank. Hence, it may be advantageous to detect and act on an angular difference to the surface normal in the rage of 5-45 degrees, or 10-40 degrees, or 20-35 degrees or 5-30 degrees.

That the transmittance of the measuring signals is discontinued if e.g. the inclination of the hatch is outside a give range, may be advantageous e.g. as it decreases the risk for misreadings if the hatch is dislocated. It may also be advantageous as it e.g. decreases the risk of violating telecom approvals. That the signal transmittance is discontinued when the hatch is opened decreases the risk that the RLG locks on false echoes.

According to one example, movements of the hatch due to e.g. thermal expansion or movements of the surroundings is tolerated by the system, and no action is taken in these situations. This can be implemented e.g. by choosing the threshold level high enough, or by involving the amount of time and/or how often the threshold value has been exceeded. [This is just one example among many other possible implementations]

The RLG system or RLG arrangement may comprise surface selection logic. This is most often advantageous, but if the hatch is opened without turning off the signal transmittance, the RLG may lock on a surface outside the tank and continue to be locked on this surface also after the hatch has been closed. In this case the system or arrangement often needs to be reset, before correct measurements of the fill levels may be achieved again. Hence, according to one example the angular output is communicated to said second circuitry and a reset of the measurements is made based on the value of the angular output. In other words, if the angular output indicates e.g. that the angular difference between said first direction and the vertical axis is more than e.g. 5, 10, 15, 20, 25, 30, 35, 40 or 45 degrees, the measurement process may be reset or any other of the actions described herein may be initiated or taken.

Additionally or alternatively, a threshold value linked to the angular velocity of the first axis may also be used, as explained above.

That an alarm is triggered or activated if e.g. the inclination of the hatch is outside a give range, is advantageous as it enables a person monitoring the system or arrangement to put the hatch back in position again. In other words, if the hatch is dislocated so that the readings may not be relied upon any more an alarm may be triggered and/or the transmittance of the measuring signals may be turned off.

The threshold level or levels may be selected as desired. According to one non-limiting example, a first and a second threshold value are selected, wherein the first threshold value corresponds to a smaller dislocation or inclination of the hatch compared to said second threshold value; and the dislocation or inclination of the hatch is normally determined compared to a predetermined closed position of the hatch, however other positions of the hatch is equally possible as reference positions. According to one non-limiting example, when the hatch has an inclination that is larger than said first threshold value a first alarm is triggered, and when said hatch has an inclination that is larger than said second threshold value the transmittance of the measuring signals is discontinued. Additionally or alternatively, there may be a third and a fourth threshold value and even more threshold values, each corresponding to a different inclination of the hatch and to an action that should be initiated. In more detail, one or several actions may be initiated at each threshold value; and/or two threshold values (such as said first and said second threshold value) may correspond to exactly the same inclination of the hatch. Further, a threshold can be selected such that it corresponds to an inclination of the hatch, which is smaller than the inclination of the hatch when it is opened.

Alternatively or additionally, that radar level gauge arrangement is arranged to initiate an action based on the result of the comparison with at least one threshold value, is advantageous as this may avoid that the radar level gauge locks on false echoes. In more detail, the system or arrangement may be arranged such that when the hatch is opened the transmittance of the measuring signals is automatically discontinued so that the radar level gauge e.g. does not lock on false echoes and/or radiation leaks outside the tank. Optionally, when e.g. the hatch is closed and back in its proper position the transmittance of the measuring signals may automatically be turned on again.

Alternatively or additionally, that radar level gauge arrangement is arranged to initiate an action based on the comparison with at least one threshold value indicative of the inclination of the hatch, may be advantageous as this may enable the activation of an alarm if the hatch is opened and/or is open more than a predetermined time interval. This may e.g. occur if the locking mechanism for keeping the hatch in place malfunctions, or if someone forgets to lock the hatch after maintenance or inspection. Hence, an alarm may be triggered immediately or simultaneously as the hatch is opened, or after a predetermined time interval. Optionally, when e.g. the hatch is closed and back in its proper position the alarm is deactivated and/or the transmittance of the measuring signals may automatically be turned on again. Preferably, there is a function which enables that the activation of the alarm is temporarily switched off during the maintenance or inspection. Optionally, there is a function which, e.g. a predetermined time after such a temporary switch off, checks that the hatch has been properly closed, and if it hasn't activates the alarm.

In other words, the output from the inclination sensor can be used to trigger an alarm or automatically shut down the microwave energy when the antenna is not pointing towards the product surface; e.g. when the hatch is opened for service or sampling of the tank content. Hence, the risk of transmitting microwaves outside the tank can be eliminated or at least substantially reduced.

Further, the output from the inclination sensor may be used to periodically check that the transmitter is arranged in the desired or proper position, and if not e.g. either trigger an alarm, corrects the measurements values and/or steer the antenna into the proper position.

Optionally, the RLG may comprise a data input means for inputting data for adjusting the threshold value. In other words, it may be possible for the operator to e.g. input the threshold levels at the installation site, and thereby provide threshold values tailored to the tank where the RLG is installed. It may also be possible for the operator to adjust the threshold values after some days, months or years, if this is desired.

According to one non-limiting example the radar level gauge arrangement comprises a presenter connected to said second processing circuitry, which presenter is adapted to receive said angular output and to generate a communication output communicating information about the angular difference to a receiver of the communication output. The presenter may or may not be attached to the housing for said transmitter and said inclination sensor.

That the presenter communicates the communication output externally of said system, equals that the communication output is receivable outside the housing of the RLG system or the RLG arrangement. That the communication output is receivable outside the housing means that a device or an operator located outside the housing may receive the communication output, e.g. visually, audibly, tactilely (normally operator) or by means of wire/cable or wirelessly (normally device).

The communication output may comprise status information about the RLG system, which is to be received by an external device e.g. a hand held device, a portable device or a control room [the list is non-exhaustive]. The status information may be provided to the device by any communication means, such as via a cable or wirelessly. The status information may comprise one or more parts, where each part may indicate e.g.:

the value of a given property of the RLG system, and/or that the value of a given property of the RLG system exceeds or is below and/or is equal to a predetermined value, and/or that the value of a given property of the RLG system is within or without a predetermined range.

The given property of the RLG system may be any property, such as e.g.:

the angular difference between the first axis and the surface normal, the angular velocity by which the hatch has been moved, the amount of time e.g. the hatch has been opened, or the amount of time that as been registered for some other event;

that the system is working correctly;

etc

[the list is non-exhaustive]

The status information may comprise one or more parts comprising the same type of information; i.e. there may be e.g. two parts indicating that the angular difference exceeds a predetermined threshold value, each part being linked to a different (or the same) threshold value.

In other words, one part of the status information may indicate that an alarm condition is fulfilled (e.g. the angular difference exceeds a predetermined value), while another part may indicate that the alarm should be discontinued; and not until a predetermined time has passed (e.g. 20-30 minutes) the other part goes active and indicates that an alarm may be issued. This may be the case e.g. when the hatch is opened and the alarm is delayed for 20-30 minutes; if the hatch is closed again within this time no alarm is issued. For this or other actions, the alarm may be turned on more rapidly or delayed even further.

That the RLG comprises a presenter is advantageous, as this may be used for communicating the alarm discussed above. The presenter may also be used for providing detailed information about the orientation of the radar transmitter and/or the orientation of the first axis. The receiver of such information may be an operator or another device. In more detail, the output from the inclination sensor may be used to aid the operator when installing or calibrating the radar level gauge arrangement. Under installation the reading of the inclination sensor can be presented to the person doing the installation. This will aid him/her in aligning the antenna beam into the desired position, e.g. normally vertical. The presentation could be in the form of a built-in display on the RLG, sent to a presentation device such as a mobile phone or tablet. An indicator light or buzzer/loudspeaker can also be integrated in the RLG to give feedback to the installer.

Furthermore, if the RLG is equipped with an electrically adjustable antenna (phased array or similar), the output from the inclination sensor can be used by a processor in the RLG to automatically compensate for a non-ideal installation of the antenna. The compensation may be performed by automatically orient or steer the antenna into the proper position.

In more detail, said presenter may comprise at least one of a display, a loudspeaker, and an electromagnetic radiation sender [the list is non-exhaustive]; and said electromagnetic sender may communicate via any protocol and any means enabling e.g. short distance communication, such as Bluetooth and/or IR-signals, and/or communication via mobile telephones (enabling long distance and near field communication).

According to one non-limiting example, information about the angular difference is constantly provided to the presenter; alternatively or additionally information about the angular difference is provided to the presenter at predetermined instance. Further, the presenter may continuously present the information to the receiver and/or only present the information to the receiver at predetermined instances. These predetermined instances is e.g. when the angular difference exceeds and/or is below a predetermined threshold value; and/or is inside a predetermined interval; and/or occurs due to e.g. some other parameter reaching or falling below a predetermined value [the list is non-exhaustive].

According to one non-limiting example the first processing circuitry is adapted to receive the angular output and to adjust said determined fill level based on the angular output. In other words, if the transmitter has a non-vertical orientation and this leads to a miscalculation of the fill level of the tank, the output from the inclination sensor may be used to correct the calculated fill level. In yet other words, the determined distance may be corrected using the inclination output to e.g. compensate for a longer traveling path when the direction of the radar beam deviates from the normal to the surface to be measured.

According to one non-limiting example, said first processing circuitry and said second processing circuitry are integrated in one common circuit.

According to one non-limiting example, the RLG comprises a wave guiding structure for guiding the measuring signals in the tank, and in more detail, for guiding the measuring signal toward the surface in the tank and for guiding the echo signal away from said surface.

In summary, there is provided a radar level gauge arrangement for determining the fill level of a filling material in a tank, which arrangement is mounted on a hatch of a tank and/or on a support which is adapted to be mounted on a hatch of a tank. The arrangement comprises a transmitter for transmitting measuring signals at least along a first axis for determining the fill level of the tank; an inclination sensor for generating an inclination output corresponding to the inclination of said sensor relative at least an axis or a plane; a second processing circuitry adapted to receive said inclination output and to generate, based on said inclination output, an angular output as a function of the angular difference between the first axis and at least one of a predetermined axis and a predetermined plane. According to one exemplifying embodiment, the angular difference is given relative at least one predetermined axis is e.g. an horizontal axis and/or a vertical axis. However, the at least one predetermined axis may be a set of any number of axes, wherein each axis may point in any direction. Additionally or alternatively, the angular difference is given relative at least one predetermined plane, e.g. a horizontal plane and/or a vertical plane. However, the at least one predetermined plane may be a set of any number of planes, wherein each plane may have any orientation (i.e. a normal to each plane may point in any direction).

BRIEF DESCRIPTION OF THE DRAWINGS

For exemplifying purposes, the invention will be described in closer detail in the following with reference to embodiments thereof illustrated in the attached drawings, wherein.

In the Figures, the same reference numerals denote the same or functionally similar components, unless indicated otherwise.

DETAILED DESCRIPTION OF EXEMPLIFYING EMBODIMENTS

Figure 1:
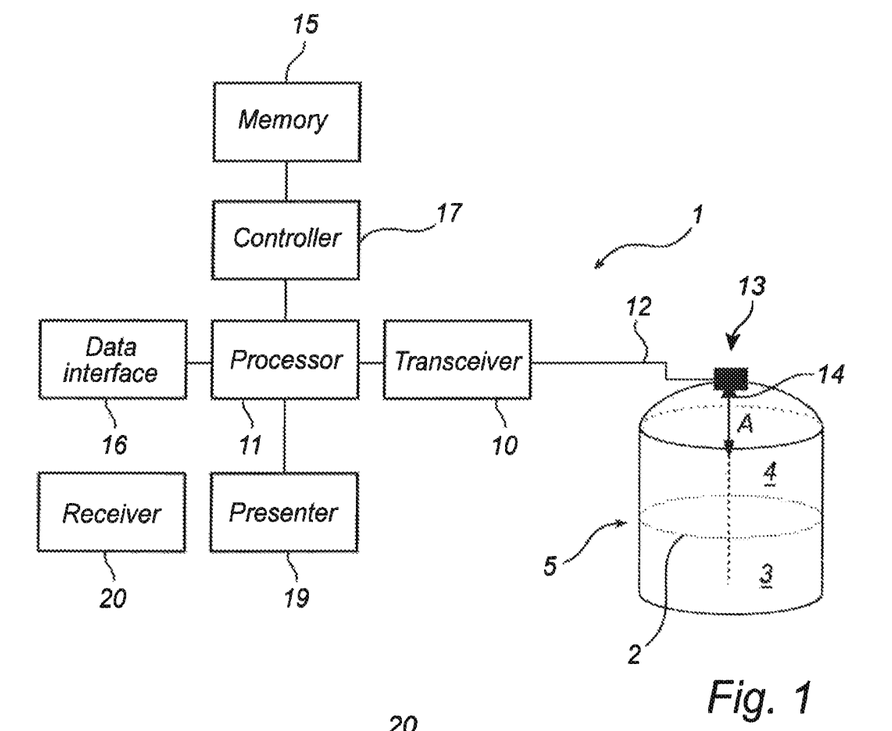
FIG. 1 is a schematic illustration comprising side view of a container at which an a radar level gauge arrangement is arranged, and a schematic illustration of the radar level gauge arrangement according to one embodiment.

FIG. 1 shows schematically a radar level gauge system 1 or a radar level gauge arrangement 1 to which the invention may be advantageously incorporated. The system or arrangement 1 is arranged to perform measurements of a fill level in the tank, i.e. the level of an interface 2 between two materials 3, 4 in a tank 5. Typically, the first material 3 is a liquid stored in the tank, e.g. gasoline or a liquefied gas, while the second material 4 is air, vapor, or inert gas. The tank may be stationary or arranged on a moving vehicle, such as on a tanker.

In an exemplifying embodiment, the system or arrangement in FIG. 1 comprises an electronic unit for transmitting and receiving radar signals and processing the received signals in order to determine the level in the tank, such as a transceiver 10, controlled by a processor 11 to transmit electromagnetic signals over a signal guiding medium 12 to the tank 5. The components are arranged in a housing 13. The system or arrangement may use pulsed or continuously emitted radiation. In case pulsed signals are used, the signals can be DC pulses with a length of about 2 ns or less, with a frequency in the order of MHz, at average power levels in the nW or μW area. Alternatively, the pulses are modulated on a carrier wave of a GHz frequency. The signal guiding medium 12 can be any wave guiding structure, such as a hollow wave guide or a coaxial wire. The transceiver may also be directly connected to a connection in the tank, in which case the signal guiding medium 12 simply comprises the connection terminal of the transceiver. If required, the tank is provided with a sealing, arranged to allow the electromagnetic signals to pass through the wall of the tank 5 while maintaining an air tight seal, so as to prevent tank contents from escaping from the tank. Inside the tank 5, the electromagnetic signals are emitted towards the surface 2 along a first direction A. In the illustrated case, the signals are emitted by a transmitter (not shown, however shown in e.g. FIGS. 5a-5c) which is a part of the transceiver, and guided by a wave guiding structure, e.g. a stilling well 14. Alternatively, the signals could be emitted by a radar antenna, and propagate freely through the tank medium.

In the above-discussed embodiment the microwave is transmitted via a stilling well 14, which communicates with the product. However, the invention can just as well be used for a radar level gauge with a freely propagated beam and it could be used for any kind of level gauging, where the level of a product surface is supervised.

After reflection against the surface 2, the electromagnetic signals may again guided by the stilling well 14 back to the transceiver 10, where they are sampled and digitalized in a process controlled by a processing circuitry, such as a processor 11. The processor is provided with software for analyzing the signal in order to determine a the fill level in the tank, i.e. the level of the surface 2. The processor 11 is preferably a microprocessor based circuit adapted to receive the incoming signal, as discussed above, and provide as an output a signal or information indicative of the level of material 3. The functions and algorithms implemented by signal processor 11, some of which can be embodied in hardware and some of which can be embodied in software, are per se known from the art will not be discussed further in this application.

Figure 2:
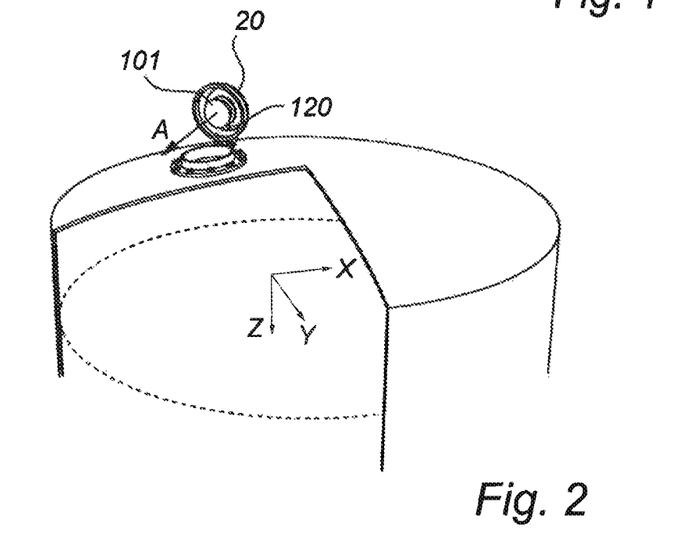
FIG. 2a is a schematic perspective view, partly illustrating the inside of a container.
Figure 3A:
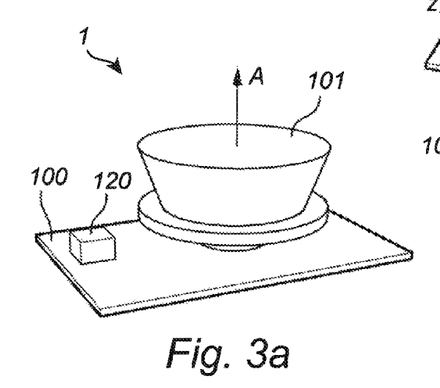
FIG. 3a is a schematic perspective view of a radar level gauge arrangement.

As schematically illustrated in FIG. 2, the radar level gauge arrangement 1 may be arranged on a hatch 20 of the tank 5; or, as schematically illustrated in FIG. 3a, be arranged on a support 100 which is to be attached to the 20 hatch of a tank 5. By providing information about the position of the hatch, an improved control of the level measurements can be obtained. By continually monitoring the position of the hatch, by utilizing the output from the inclination sensor, a better precision in the measurements from the RLG may be obtained; as measurements made when the orientation of the hatch is outside a predetermined interval may be disregarded and/or the transmittance of measurements signals may be temporarily turned off. Alternatively or additionally, when the orientation of the hatch is outside a predetermined interval, an alarm may be activated. In other words, the RLG arrangement may be used for monitoring or verifying that the hatch is in the correct position.

In more detail, a transmitter 101 or transceiver 10 is attached to the hatch or a support 100, and adapted to transmit measuring signals at least along a first axis (A) for determining the fill level of the tank 5. Further, there is an inclination sensor 120 attached to the hatch or support 100, and adapted to generate an inclination output 121 corresponding to the inclination of said sensor 120 relative at least one of a horizontal axis, a vertical axis, a horizontal plane and a vertical plane. The horizontal plane normally coincides with the interface 2 between the two materials in the tank; and consequently the vertical axis normally coincides with the surface normal of said interface. The processor or second processing circuitry 11 is adapted to receive said inclination output 121 and to generate, based on said inclination output, an angular output 111 as a function of the angular difference between the first axis and at least one of a predetermined axis and a predetermined plane.

Figure 3B:
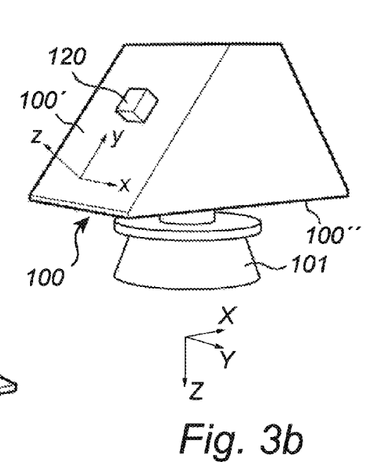
FIG. 3b is a schematic perspective view of a another radar level gauge arrangement.

As schematically illustrated in FIG. 3b, the support 100 may have other configurations besides planar, and the surface 100' to which the inclination sensor 120 is attached, may have a different orientation compared to the surface 100" to which the transmitter 101 is attached. However, the two surfaces 100' and 100" are preferably fixed relative each other so that the readings from the inclination sensor may be converted into the orientation of the transmitter. In other words, the two surfaces 100' and 100" together form a support to which said inclination sensor 120 and said transmitter 101 are attached. As illustrated in FIG. 3b, the output from said inclination sensor can be given using one frame of reference (x,y,z); which is thereafter converted into another frame of reference (X,Y,Z) which is used for the angular output, wherein one of said axis X; Y; Z preferably coincides said first axis A. When the surfaces 100', 100", that transmitter and the inclination sensor is arranged on, coincides as illustrated in FIG. 3a; the frames of reference may also coincide or just be translations relative each other.

Figure 3C:
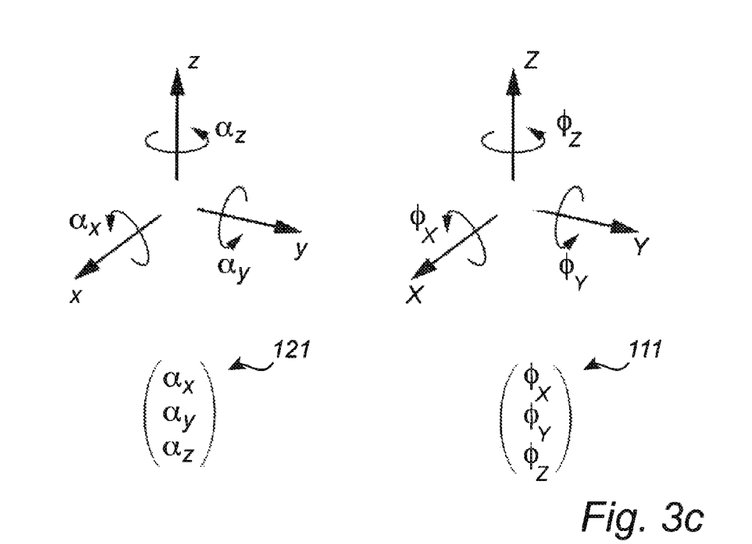
FIG. 3c is a schematic example of the format of the inclination output and the angular output.

As illustrated in FIG. 3c, the inclination output 121 of the inclination sensor 120 can be given as the rotation around each one of three Cartesian axes ($\alpha_x, \alpha_y, \alpha_z$), and optionally one or two of the axis can be omitted. Similarly, the angular output 111 generated by the second processing circuitry, may also be given as the rotation around each one of three Cartesian axes ($\phi_X, \phi_Y, \phi_Z$), and optionally one or two of the axis can be omitted. As described above other alternatives of arranging the angular information is equally plausible. In other words, the inclination output and/or the angular output is preferably based on a vector having 1, 2 or 3 elements.

Figure 4:
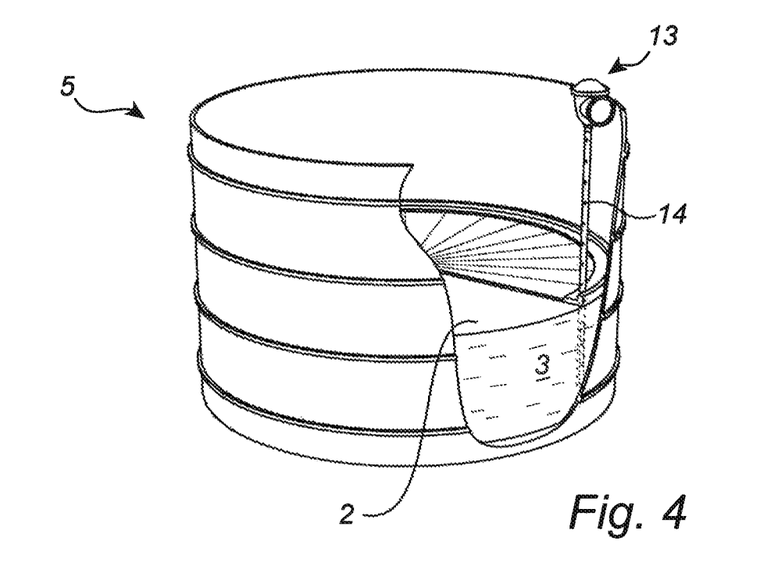
FIG. 4 is a schematic illustration comprising a perspective side view of a container at which an a radar level gauge arrangement is arranged, including a partial cut-out of the container wall.
Figure 5A:
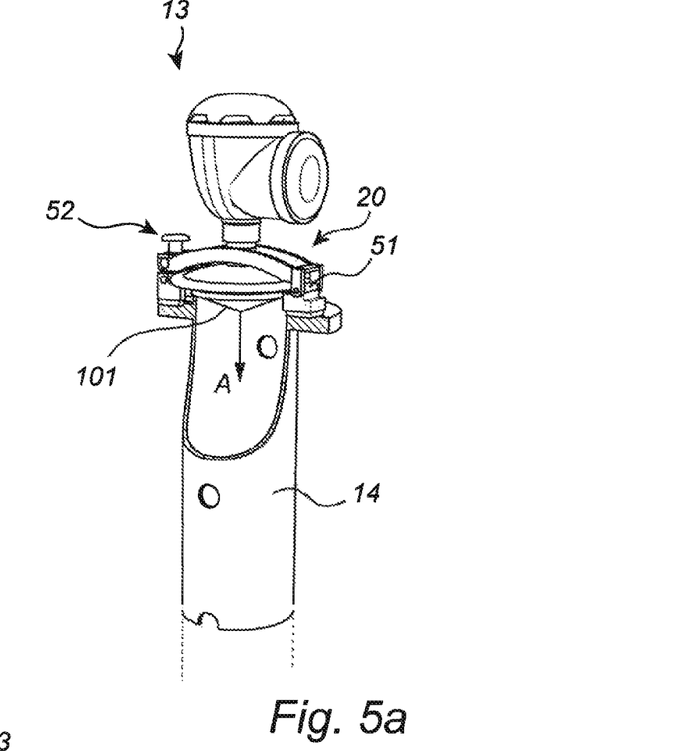
FIG. 5a is schematic partial view of an RLG and a stilling well.
Figure 5B:
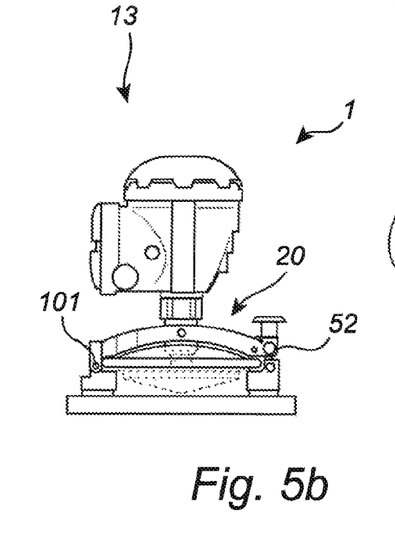
FIGS. 5b and 5c are partial side views of a tank comprising a hatch where to an RLG is attached.
Figure 5C:
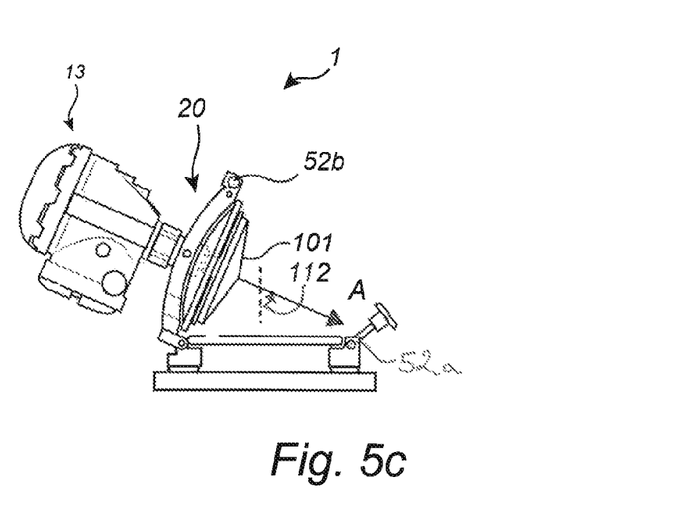

FIG. 4 schematically illustrates a wave guiding structures 14 of an RLG arrangement or RLG system arranged inside a tank comprising a floating roof. FIGS. 5a to 5c schematically shows the RLG arrangement or the RLG system of FIG. 4 in more detail. FIG. 5a schematically illustrate a close up of the hatch 20 comprising a locking mechanism 52 and a hinge 51 around which said hatch is rotatable. The transmitter 101 is arranged in one end of the wave guiding structure 14 and emits radiation along a first axis A, which wave guiding structure according to this example is an elongated pipe comprising two rows of through holes arranged on two opposing sides to the pipe. The transmitter 101 is attached to the side of the hatch which faces the inside of the tank, when the hatch is closed. According to this example, the inclinometer is not visible from the outside, but is arranged inside a housing 13. This housing may also accommoda e.g. the processor 11, the controller 17, the memory 15, the data interface 16 and the presenter 19. FIGS. 5b and 5c schematically illustrates the hatch in a closed and opened condition, respectively. In FIG. 5c a first part of the locking mechanism 52a is attached to the tank and a second part of the locking mechanism 52b is attached to the hatch. The first and second part of the locking mechanism are arranged to fixedly engage with each other.

Figure 6:
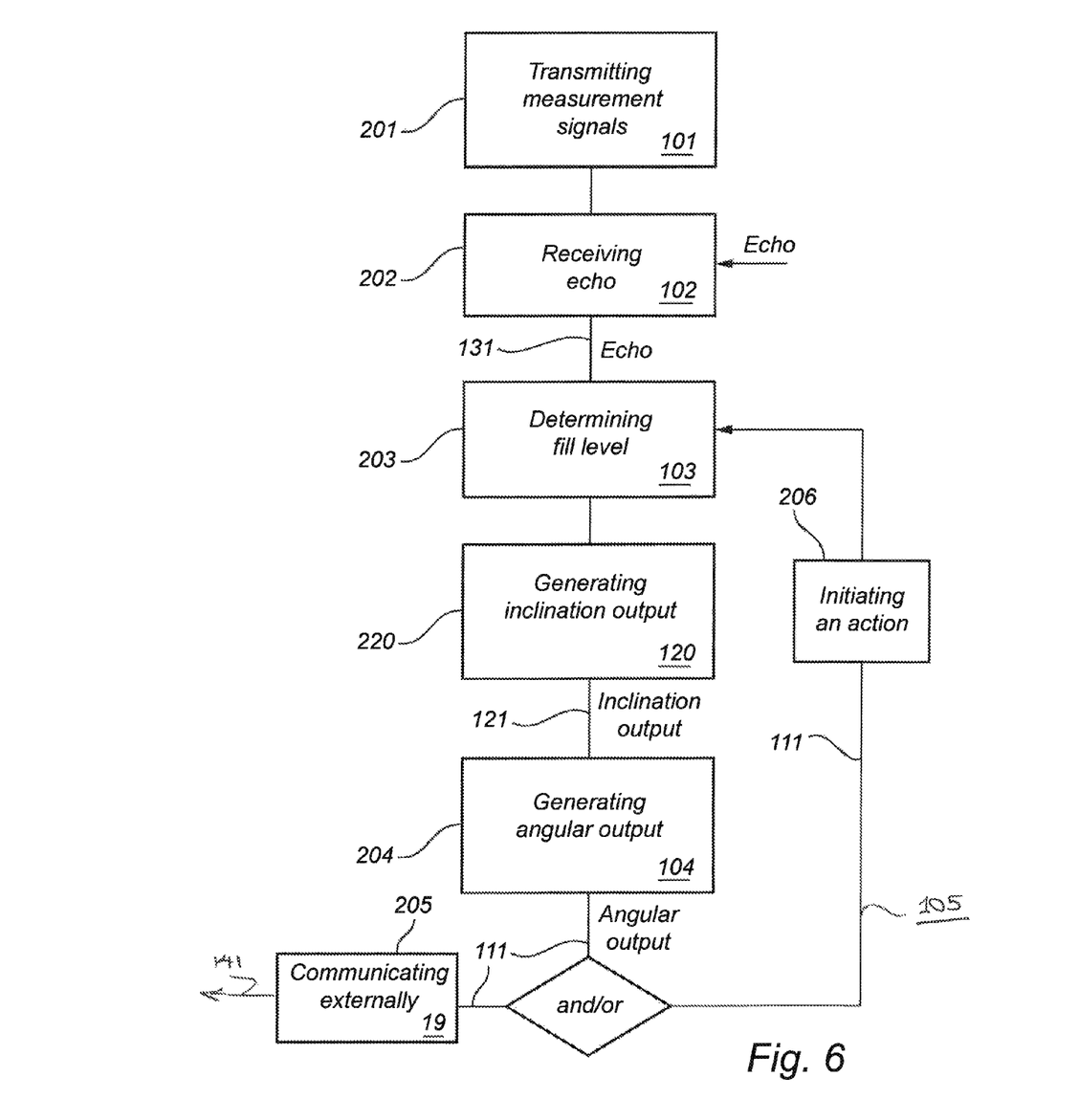
FIG. 6 schematically illustrates a method for a radar level gauge system.

FIG. 6 schematically illustrates a method for a radar level gauge system, which system is attached to the hatch of the tank, comprising the steps of:

transmitting 201 measuring signals at least along a first axis for measuring the distance to a surface in a tank, e.g. using a transmitter 101, receiving 202 echo signals corresponding to the distance to the surface 2 in the tank 5 when the first axis A is parallel to a normal to the surface, e.g. using a receiver 102, determining 203 a fill level of the tank based on the received echo signal, e.g. using a first processing circuitry 103, generating 220 an inclination output 121 corresponding to the inclination of the first axis A, e.g. using an inclination sensor 120, generating 204, based on the inclination output, an angular output 111 when there is an angular difference between the first axis A and the normal to the surface, e.g. using a second circuitry 104, further comprising at least one of:

communicating information 205 about the angular difference externally of said system, e.g. using a presenter 19 and initiating an action 206 based on the angular output, which action affects the step of determining a fill level of the tank.

Reverting now to FIG. 1, the system or arrangement may also comprise a storage means, such as a memory 15, for holding at least one threshold value, and being connected to and accessible by the processor or a controller 17. The memory content could be adjustable or replaceable, in order to enable modification of the threshold value(s). The memory could e.g. be a conventional RAM, a flash-memory or the like. Preferably, a non-volatile memory is used. The system or arrangement may also comprise input means for inputting data for replacing or adjusting the threshold value in the memory 15. The data input means could be a data input interface 16 to be connected to an extern control unit or to a portable device such as a handheld computer. Alternatively, the data input means could comprise stationary input equipment, such as a keyboard, a touch screen or the like. The input means could also be adapted to enable authorization and/or authentication control of input data. Such authorization/authentication control could be executed and managed by the processor 11. For example, the input means may request a password or similar authentication tokens in order to permit modification of the stored threshold data.

Further, the system or arrangement may comprise a controller 17 adapted to receive the angular output 111, and to compare said angular output 111 to the threshold value(s), and to initiate an activity such as activate an alarm and/or discontinue the transmittance of the measuring signals, based on the result of said comparison.

In other words, if it is determined that the hatch has been displaced an alarm may be activated and/or the transmittance of the measuring signals may be discontinued. The threshold value(s) may also be chosen such that an alarm is activated and/or the transmittance of the measuring signals is discontinued when the hatch is opened. Optionally, the threshold value(s) may also be chosen such that an alarm is activated when the hatch has been open longer than a predetermined time.

The system or arrangement may further comprise a presenter 19 connected to said second processing circuitry 11 and being adapted to receive said angular output 111 and to generate a communication output communicating information about the angular difference to a receiver 20 of the communication output.

In other words, information about the orientation of the hatch may be forwarded to a presenter to inform a receiver about the orientation of the hatch. The presenter may e.g. be a display, a loud speaker or a lamp, and the receiver may be a device or an operator [the lists are non-exhaustive].

The information communicated via the presenter may e.g. be used to continuously monitoring the orientation of the hatch, and/or for aiding a person to find a correct orientation of the antenna beam. In the latter case the information can be given as a deviation from a given axis or a plane, which may be given continuously and instantaneously to the operator so that the operator is informed when the hatch and/or the RLG has been given the correct orientation. Further, the information about the orientation of the hatch may also be used for automatically, i.e. non-manually, give the hatch and/or the RLG a desired orientation e.g. by electronic control means. When an automatic adjustment of the RGL and/or the hatch is desired, the values from the inclination output and/or angular output is received by a control device which adjusts the RLG and/or the hatch based on the result from the comparison of the angular output and the at least one threshold value. Optionally, when the automatic adjustment has been completed this can be verified by checking the current inclination output and/or the current angular output.

Further, for RLG:s equipped with an electrically adjustable antenna, the inclinometer can be used by the processor in the RLG to automatically compensate for non-ideal installations of the antenna. In other words, when a level measurement has been generated based on the reflected signal, this value can be used to adjust the direction in which the antenaa is pointing.

Specific embodiments of the invention have now been described. However, several alternatives are possible, as would be apparent for someone skilled in the art. For example, many different components may be used for performing the various functions of the radar gauge system or the radar gauge arrangement and the processing circuitries well as one component may be used for performing two or more different functions of the radar gauge system/arrangement and the processing circuitries, as would be readily apparent for someone skilled in the art. Further, many different types of threshold values may be used within the system/arrangement as outlined above, the system/arrangement may use pulsed or continuously transmitted measuring signals, etc. Such and other obvious modifications must be considered to be within the scope of the present invention, as it is defined by the appended claims. Furthermore, the RLG arrangements may be useful also in other applications than the once described above, e.g. when mounted on other movable objects, as it provides means for detecting the inclination of the RLG and switching off the signal transmittance when the transmitter is not directed sufficiently downwards—such functionality might be required to fulfill telecom approval authorities to avoid transmitting microwaves outside the metallic tank.

What is claimed is:

1. A radar level gauge system for mounting on a hatch of a tank comprising:
    a housing adapted to be attached to a hatch of a tank, whereby said housing follows a rotational movement of said hatch,
    a support arranged inside the housing;
    a transmitter arranged inside the housing, which transmitter is attached to the support and adapted to transmit measuring signals at least along a first axis for measuring the distance to a surface in a tank,
    a receiver arranged inside the housing and adapted to receive echo signals corresponding to the distance to the surface in the tank when the first axis is parallel to a normal to the surface,
    a first processing circuitry arranged inside the housing, adapted to receive the echo signals and to determine a fill level of the tank based on the echo signal,
    an inclination sensor arranged inside the housing, and attached to the support, whereby said sensor follows a rotational movement of said hatch, and adapted to generate an inclination output corresponding to the inclination of the sensor relative the normal to the surface,
    a second processing circuitry arranged inside the housing and adapted to receive the inclination output and to generate, based on the inclination output, an angular output when there is an angular difference between the first axis and the normal to the surface, further comprising at least one of:
    a presenter adapted to receive the angular output from said second processing circuitry and to generate a communication output communicating information, about the angular difference, externally of said system, wherein said system comprises a presenter and said communication output comprises status information, which status information comprises a part indicating the value of a given property of the RLG system, said given property being at least one of: that the hatch is open, the angular velocity by which the hatch has been moved, or the amount of time the hatch has been opened, and
    a communication path arranged inside said housing, electrically connecting said first processing circuitry and second processing circuitry, and being adapted to receive the angular output from said second processing circuitry and to communicate the angular output to said first processing circuitry, wherein said system comprises a communication path, and said first processing circuitry is adapted to initiating an action based on said angular output, said action being at least one of: automatically adjust the hatch into the proper position, and to reset the distance measurements after the hatch has been open, before measurements of the fill levels are resumed.

2. The radar level gauge system according to claim 1, wherein the inclination output is based on a vector having a number of elements, wherein the number of elements is between 1 and 3.

3. The radar level gauge system according to claim 1, wherein said system comprises a presenter, and said second processing circuitry is further adapted to compare the inclination output to at least one predetermined threshold value, and to generate the angular output based on the result from the comparison of the inclination output and the at least one threshold value, and
    wherein the presenter is further adapted to issue an alarm based on said angular output.

4. The radar level gauge system according to claim 3, further comprising a data input means for inputting data for adjusting the threshold value.

5. The radar level gauge system according to claim 1, wherein the presenter comprises at least one of a display, a loudspeaker, and an electromagnetic radiation sender.

6. The radar level gauge system according to claim 1, wherein said system comprises a communication path, and said first processing circuitry is adapted to initiating an action based on said angular output, said action being at least one of: discontinue the transmittance of the measuring signals, resetting the measurement of the distance to a surface in a tank and adjusting the value of the determined fill level in the tank.

7. The radar level gauge system according to claim 1, wherein the first processing circuitry and the second processing circuitry are integrated in one common circuit.

8. The radar level gauge system according to claim 1, further comprising a wave guiding structure for guiding the measuring signals in the tank.

9. A radar level gauge system according to claim 1, wherein said radar level gauge system is mounted on a hatch of a tank.

10. A radar level gauge arrangement mounted on a hatch of a tank, said radar level gauge arrangement comprising:
- a housing attached to a hatch of a tank, whereby said housing follows a rotational movement of said hatch,
- a transmitter arranged inside the housing, attached to a support and adapted to transmit measuring signals at least along a first axis for measuring the distance to a surface in a tank,
- a receiver arranged inside the housing and adapted to receive echo signals corresponding to the distance to the surface in the tank when the first axis is parallel to a normal to the surface,
- a first processing circuitry arranged inside the housing, adapted to receive the echo signals and to determine a fill level of the tank based on the echo signal,
- an inclination sensor arranged inside the housing, and attached to the support, whereby said sensor follows a rotational movement of said hatch, and adapted to generate an inclination output corresponding to the inclination of the sensor relative the normal to the surface,
- a second processing circuitry arranged inside the housing and adapted to receive the inclination output and to generate, based on the inclination output, an angular output when there is an angular difference between the first axis and the normal to the surface, further comprising at least one of:
- a presenter adapted to receive the angular output from said second processing circuit and to generate a communication output communicating information about the angular difference externally of said system, wherein said system comprises a presenter and said communication output comprises status information, which status information comprises a part indicating the value of a given property of the RLG system, said given property being at least one of: that the hatch is open, the angular velocity by which the hatch has been moved, or the amount of time the hatch has been opened, and
- a communication path arranged inside said housing, electrically connecting said first processing circuitry and second processing circuitry, and being adapted to receive the angular output from said second processing circuit and to communicate the angular output to said first processing circuitry wherein said system comprises a communication path, and said first processing circuitry is adapted to initiating an action based on said angular output, said action being at least one of: automatically adjust the hatch into the proper position, and to reset the distance measurements after the hatch has been open, before measurements of the fill levels are resumed.

11. A method for a radar level gauge system, which system is attached to the hatch of the tank and follows a rotational movement of said hatch, comprising:
- transmitting measuring signals at least along a first axis for measuring the distance to a surface in a tank,
- receiving echo signals corresponding to the distance to the surface in the tank when the first axis is parallel to a normal to the surface,
- determining a fill level of the tank based on the received echo signal,
- generating an inclination output corresponding to the orientation of the first axis,
- generating, based on the inclination output, an angular output when there is an angular difference between the first axis and the normal to the surface,
- further comprising at least one of:
  - communicating information about the angular difference externally of said system, and
  - initiating an action based on the angular output, which action affects the step of determining a fill level of the tank.

12. The method according to claim 11, comprising initiating an action based on the angular output, and wherein the action comprises at least one of adjusting the determined fill level of the tank based on the angular output, discontinue the transmittance of measuring signals and resetting the measurement of the distance to the surface in the tank.

13. A radar level gauge system for mounting on a hatch of a tank comprising:
- a housing adapted to be attached to a hatch of a tank, whereby said housing follows a rotational movement of said hatch,
- a support arranged inside the housing;
- a transmitter arranged inside the housing, which transmitter is attached to the support and adapted to transmit measuring signals at least along a first axis for measuring the distance to a surface in a tank,
- a receiver arranged inside the housing and adapted to receive echo signals corresponding to the distance to the surface in the tank when the first axis is parallel to a normal to the surface,
- a first processing circuitry arranged inside the housing, adapted to receive the echo signals and to determine a fill level of the tank based on the echo signal,
- an inclination sensor arranged inside the housing, and attached to the support, whereby said sensor follows a rotational movement of said hatch, and adapted to generate an inclination output corresponding to the inclination of the sensor relative the normal to the surface,
- a second processing circuitry arranged inside the housing and adapted to receive the inclination output and to generate, based on the inclination output, an angular output when there is an angular difference between the first axis and the normal to the surface, further comprising:
- a communication path arranged inside said housing, electrically connecting said first processing circuitry and second processing circuitry, and being adapted to receive the angular output from said second processing circuitry and to communicate the angular output to said first processing circuitry,
- wherein said system comprises a presenter adapted to receive the angular output from said second processing circuitry and to generate a communication output which comprises status information, which status information comprises a part indicating the value of a given property of the RLG system, said given property being at least one of: that the hatch is open, the angular velocity by which the hatch has been moved, or the amount of time the hatch has been opened.

14. The radar level gauge system according to claim 13, wherein the inclination output is based on a vector having a number of elements, wherein the number of elements is between 1 and 3.

15. The radar level gauge system according to claim 13, wherein said system comprises a presenter, and said second processing circuitry is further adapted to compare the inclination output to at least one predetermined threshold value, and to generate the angular output based on the result from the comparison of the inclination output and the at least one threshold value, and wherein the presenter is further adapted to issue an alarm based on said angular output.

16. The radar level gauge system according to claim 15, further comprising a data input means for inputting data for adjusting the threshold value.

17. The radar level gauge system according to claim 13, wherein the presenter comprises at least one of a display, a loudspeaker, and an electromagnetic radiation sender.

18. The radar level gauge system according to claim 13, wherein said system comprises a communication path, and said first processing circuitry is adapted to initiating an action based on said angular output, said action being at least one of: discontinue the transmittance of the measuring signals, resetting the measurement of the distance to a surface in a tank and adjusting the value of the determined fill level in the tank.

19. The radar level gauge system according to claim 13, wherein the first processing circuitry and the second processing circuitry are integrated in one common circuit.

20. The radar level gauge arrangement according to claim 13, further comprising a wave guiding structure for guiding the measuring signals in the tank.

\* \* \* \* \*